UNITED STATES PATENT OFFICE.

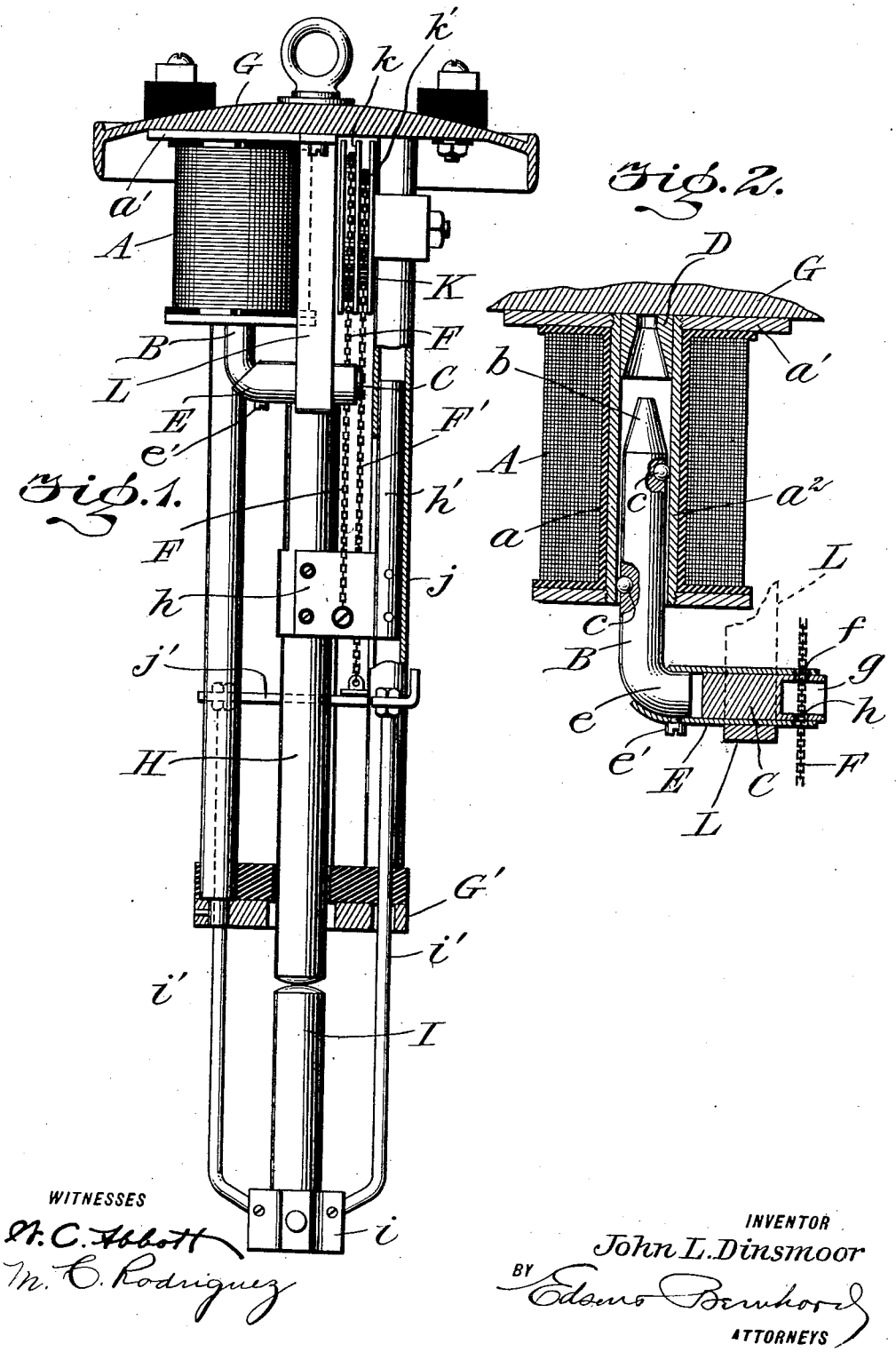

JOHN L. DINSMOOR, OF BROOKLYN, NEW YORK.

ELECTROMAGNETIC MECHANISM.

1,293,052.  Specification of Letters Patent.  Patented Feb. 4, 1919.

Application filed August 1, 1914. Serial No. 854,567.

*To all whom it may concern:*

Be it known that I, JOHN L. DINSMOOR, a citizen of the United States, residing at the city of New York, borough of Brooklyn, county of Kings, and State of New York, have invented a certain new and useful Electromagnetic Mechanism, of which the following is a specification.

This invention is an electromagnetic mechanism, the distinctly novel feature of which is a two-piece plunger, one part of which is operable within the field of the coil and the other part is carried by said first named part so as to be movable therewith and is influenced magnetically thereby for gripping and releasing a member to be controlled.

The novel plunger of my invention is sensitive and quick acting, the gripping part or member thereof being influenced magnetically by that part or member which works in the magnetic field of the coil, said gripping member operating in a manner to overcome acceleration of the speed movement of the plunger, thus eliminating the necessity for a dash pot or other mechanical devices for checking the plunger speed.

The invention is useful in different arts wherein quick action and efficient gripping of a part to be controlled is desirable, but it possesses marked utility in controlling the feed of an arc lamp carbon or carbons, for the reason that the travel of the gripping member is only a fraction of the length of the arc, hence lost motion in the "pick up" of the carbon is eliminated to a substantial extent, or almost entirely.

In the drawings the invention is shown as applied to an arc lamp, but it will be distinctly understood that the invention is not restricted to this special application for the reason that I reserve the right to use said invention in connection with or as a part of other devices.

Figure 1 is an elevation partly in section of my solenoid when used as a carbon controlling mechanism of a focusing arc lamp.

Fig. 2 is a vertical section through the solenoid, the gripping member or part of the solenoid plunger being shown in a free position so as to release the member to be controlled. Fig. 3 is an elevation looking at the left of Fig. 1.

A designates the coil of a solenoid, the plunger of which consists of two parts or members B C. The coil is shown as wound upon a spool $a$, with which coöperates another spool $a'$. The sleeve $a^2$ of this other spool $a'$ is open at one end so that the plunger part or member B is free to travel or play therein. As shown, the plunger part B is tapering toward the upper end, at $b$, which tapering end $b$ is influenced more or less by a tapering tubular armature D, positioned within the field at the upper part of the solenoid. For reducing the frictional contact between the plunger part B and the wall of the sleeve $a^2$, which frictional contact is or may be brought about by a side draft upon the plunger due to the weight or resistance of the load or the member to be controlled, it is preferred to employ the bearing balls $c$, the same being shown as fitting loosely in sockets provided in the plunger part B and as being adapted for free rolling contact with the sleeve $a^2$. Obviously, the friction reducing bearing balls may be employed or dispensed with, as desired.

The salient feature of my invention is the two-part plunger B C, one member of which (B) is positioned for operation within the magnetic field of the coil A so as to become saturated magnetically by the lines of force constituting said field, whereas the latter member C is mechanically carried by member B for movement therewith and is magnetically influenced by said part B and the field of the coil. Accordingly, member C is so connected with member B that it partakes of the movement of said member as it is lifted by the magnetic attraction of the coil or as it is lowered by the action of gravity upon a decrease in the strength of the magnetic field; but at the same time this member C is free to move relative to member B and independently of its mechanical travel therewith, such free or independent movement of member C relative to member B being brought about on the one hand by the magnetic influence exerted by member B upon member C and on the other hand by the resistance offered by the load or member to be controlled. In the particular example of the plunger shown, member B is provided with an angular lower end or foot $e$, and to it is rigidly attached a tubular carrier E, the latter being a short length of tubing composed of brass or other non-magnetic material. This tubular carrier E is fitted on the angular foot e and is secured fixedly thereto by a screw e', said tubular carrier extending at an angle from the plunger part B. The other end of this tubular carrier is open, and near said open end the carrier is provided with a transverse opening f through which loosely passes a member or part to be controlled, the latter being shown as a flexible metal chain F. The members B C of the plunger are composed of separate pieces of soft iron, or other magnetizable material, and the two members are operatively connected by a non-magnetic tubular carrier, the latter being attached as described to member B, and within which carrier is loosely fitted the plunger member C so as to be free to have a sliding movement with respect to the end portion of plunger member B. The slidable member C is shown in the form of a solid piece of metal one end of which is chambered at g for reducing the weight, and in this hollow part of said member C is provided a transverse opening h, through which opening passes the part to be controlled, i. e. the flexible chain F.

It is apparent that the member C, when it occupies a certain position within the tubular carrier, will have the transverse perforation h of said plunger member in register with the opening f of the carrier, so that the part F to be controlled will be free to slide through these alined openings in carrier F and member C, but when the latter is magnetically attracted by part B, said member C slides within the tubular carrier E sufficiently for the opening h to move out of register with opening f, whereupon member C grips the part F by frictional contact therewith so that part F will rise or fall with the plunger.

In applying the invention to an arc lamp as shown in Fig. 1, the solenoid is supported mechanically by attaching it to a part of the lamp frame, as to the top plate G thereof. The upper carbon H is supported by a carrier h, whereas the lower carbon I is mounted in a carrier i, said carriers being movable toward and from each other. The upper carrier is shown as having a guide member h' fitted slidably to a tube j of the lamp frame, whereas the lower carrier is attached to rods i' fitted slidably in the bottom member G' of said lamp frame, said rods i' being connected by a bridge plate j'. To the two carriers are attached chains or cables F F', the former being fitted to slide freely in the apertures f h of the tubular carrier E and gripping member C of the solenoid plunger. Said chain or cable F is coiled in one direction on a spool k of a differential pulley K, the latter being supported on a rod of the lamp frame. The other chain or cable F' is attached to the bridge plate j' associated with the lower carbon holder, said chain or cable being coiled on and attached to the other spool k' of the differential pulley.

L designates a strap or shield composed, preferably, of soft iron and positioned close to and parallel with coil A, the lower part of said strap or shield depending for a suitable distance below the coil. Said lower part of the shield or strap receives the tubular carrier E which is movable with the plunger, and thus the strap or shield performs the functions of a guide for the plunger because the carrier E slides within the same and the further function of producing a partially closed magnetic circuit. The soft iron of the shield concentrates the stray lines of force emanating from the coil and intensifies the magnetic field at the lower end of the plunger member B, thus increasing the lifting efficiency of the plunger.

The operation of the solenoid when employed in connection with an arc lamp is as follows:—

When no current is flowing, the coil and plunger are deënergized and the carbons are moved together by gravity, so that the chain or cable F is free to act upon the loose plunger C in order to position it within the carrier E for the aperture h in part C to aline with aperture f in carrier E, whereby chain or cable F is free to slide through said apertures f h and the required freedom in the movement of the carbons is secured. Upon the admission of current to the lamp, the coil and plunger are energized to strike the arc, the current flowing in the usual path. The plunger member B is drawn in an upward direction by the magnetic attraction of the coil, and said plunger member is energized so as to magnetically attract member C, whereby said member C is lifted mechanically by plunger B and it is slidable in carrier E toward said member B. The member C thus grips the part to be controlled (chain or cable F) and it imparts movements to said cable or chain for the purpose of separating the carbons in striking the arc. A decrease in the strength of the magnetic field permits the plunger to descend by gravity and to act upon member C with less magnetic force, whereupon the load overcomes the magnetic pull and the chain or cable is released so as to permit the carbons to feed for restoring the arc. The action of the two parts B C of the plunger, however, is so sensitive as to respond instantly to fluctuations in the magnetic field so that the feed of the carbons is almost imperceptible, but at the same time the part C acts with marked efficiency in gripping the chain or cable F so as to preclude accidental slipping thereof with respect to the clutch or gripping member.

Having thus fully described the invention, what I claim as new, and desire to secure by Letters Patent is:

1. In an electromagnetic mechanism, the combination with a coil, of a plunger, a gripping section, means connecting said gripping section mechanically with said plunger, said gripping section being movable vertically with the plunger and being slidable in a direction transversely to the plunger by magnetic attraction thereof, and a flexible member to be controlled coöperating with the gripping section and adapted to be mechanically gripped and released by the slidable movement thereof.

2. In a device of the class described, the combination with a coil, of a soft iron plunger movable within the field of said coil and energized thereby, said plunger having an angular end portion, a soft iron gripping member magnetically attracted by said plunger, means operatively connecting said gripping member with said angular end portion of the plunger for mechanically supporting the gripping member on the plunger, said means operating to retain the gripping member in slidable relation to the end portion of said plunger, and a member to be controlled adapted by resistance to impart movement to the gripping member relatively to the plunger when the latter is deenergized.

3. In a device of the class described, the combination with a coil, of a soft iron plunger movable within the field of said coil, said plunger having an angular end portion, a carrier member attached to said angular end portion of the plunger, a gripping member supported by the carrier member for sliding movement relatively to the angular end portion of the plunger, said gripping member being magnetically attracted by said plunger, and a member to be controlled connected with said carrier member and the gripping member, said member to be controlled operating by resistance to the gripping member for imparting movement thereto when the plunger is deënergized.

4. In a device of the class described, the combination with a coil, of a soft iron plunger provided with an angular end portion, a carrier sleeve fixedly attached to said angular end portion of the plunger, said carrier sleeve being provided with an aperture, a gripping member slidable within the carrier sleeve and positioned in opposing relation to the angular end portion so as to be magnetically attracted by the plunger, said gripping member having an aperture, and a member to be controlled passing loosely through the apertures of the carrier sleeve and the gripping member.

5. In a device of the class described, the combination with a coil, of a soft iron plunger movable within the field of said coil, a carrier member attached to an end portion of said plunger, said carrier member extending at an angle to the longitudinal axis of the plunger, a gripping member slidably supported by the carrier member and positioned within the magnetic field of the plunger to be attracted thereby, said carrier member and the gripping member being provided with apertures, and a flexible member to be controlled fitted loosely in said apertures of the carrier member and the gripping member.

In testimony whereof I have signed my name to this specification in the presence of two subscribing witnesses.

JOHN L. DINSMOOR.

Witnesses:
H. I. BEMBER,
M. C. RODRIGUEZ.